US 6,590,564 B1

(12) United States Patent
McLoone et al.

(10) Patent No.: US 6,590,564 B1
(45) Date of Patent: Jul. 8, 2003

(54) ERGONOMIC COMPUTER INPUT DEVICE (75) Inventors: Hugh E. McLoone, Bellevue, WA (US); Allen M. Han, Kirkland, WA (US); Melissa S. Jacobson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/534,001

(22) Filed: Mar. 24, 2000

Related U.S. Application Data (63) Continuation-in-part of application No. 29/115,581, filed on Dec. 17, 1999, now Pat. No. Des. 437,598, and a continuation-in-part of application No. 29/115,580, filed on Dec. 17, 1999, now Pat. No. Des. 437,321, and a continuation-in-part of application No. 29/115,579, filed on Dec. 17, 1999, now Pat. No. Des. 437,854.

(51) Int. Cl.$^7$ ................................................. G09G 5/08
(52) U.S. Cl. .................... 345/167; 345/156; 345/157; 345/163; 345/162; 345/160; 345/161
(58) Field of Search ................................. 345/167, 163, 345/156, 157, 160, 161, 162; D14/409

(56) References Cited

U.S. PATENT DOCUMENTS

| 4,862,165 | A | | 8/1989 | Gart | |
|---|---|---|---|---|---|
| D374,867 | S | | 10/1996 | Canavan | |
| D385,542 | S | * | 10/1997 | Kaneko et al. | D14/114 |
| 5,767,841 | A | * | 6/1998 | Hartman | 345/167 |
| D406,121 | S | | 2/1999 | Edwards et al. | |
| 5,894,302 | A | | 4/1999 | Scenna et al. | |
| D409,181 | S | | 5/1999 | Edwards et al. | |
| D410,638 | S | | 6/1999 | Sheehan et al. | |
| D415,746 | S | | 10/1999 | Edwards et al. | |
| 6,031,518 | A | | 2/2000 | Adams et al. | |
| 6,031,522 | A | | 2/2000 | Strand | |
| D431,037 | S | | 9/2000 | Varga et al. | |
| D432,131 | S | * | 10/2000 | Jones et al. | D14/417 |
| 6,256,013 | B1 | * | 7/2001 | Siddiqui | 345/163 |
| 6,292,175 | B1 | * | 10/2001 | Sheehan et al. | 345/167 |
| 6,300,941 | B1 | * | 10/2001 | Segalle | 345/163 |
| 6,307,539 | B2 | * | 10/2001 | Suzuki | 345/159 |

FOREIGN PATENT DOCUMENTS

FR        2 698 986 A3      6/1994

OTHER PUBLICATIONS

Computer Expo 1999, "Logitech Trackman Marble+," printed in a Circuit City Advertisement, 1 page, dated Jul. 18, 1999.

* cited by examiner

Primary Examiner—Richard Hjerpe
Assistant Examiner—Ali Zamani
(74) Attorney, Agent, or Firm—Banner & Witcoff, Ltd.

(57) ABSTRACT

A computer input device that comfortably supports the hand of the user while the thumb and fingers are associated with buttons, a trackball, and a scrolling wheel carried on the device. The overall configuration of the device and the arrangement of these actuators permits the user to easily and effectively operate all of the actuators while the hand and arm of the user are in a comfortable position. The device includes a housing having thumb-side and finger-side surfaces. The trackball extends from the thumb-side surface. The finger-side surface includes four input buttons and the scrolling wheel. The thumb-side surface is fairly steep and almost at right angles to the finger-side surface. This helps enable the motion of the thumb to fall along its natural axis of flexion/extension. The thumb-side surface extends above the top of the ball to provide a stop when the thumb is moved inwardly off the ball. The buttons and the wheel on the finger-side surface are in line in a single row to allow the fingers to move within a natural range of motion for efficient control. Two of the input buttons are effectively embedded within a respective other input button. This relative positioning other allows the user to move between two buttons with either side-to-side or forward-and-back translation. Two buttons located at respective outer edges of the finger-side surface and have raised projections for tactile feedback. The housing includes a convex surface behind the ball that provides constant thumb support and reduce fatigue.

48 Claims, 4 Drawing Sheets

ERGONOMIC COMPUTER INPUT DEVICE

CROSS REFERENCE TO RELATED APPLICATIONS

This application is a Continuation-In-Part application of: (a) U.S. Design Pat. App. Ser. No. 29/115/581, filed Dec. 17, 1999, now U.S. Pat. No. Des. 437,598; (b) U.S. Design patent app. Ser. No. 29/115,579, filed Dec. 17, 1999, now U.S. Pat. No. Des. 437,854; and (c) U.S. Design patent app. Ser. No. 29/115,580, filed Dec. 17, 1999, now U.S. Pat. No. Des. 437,321.

TECHNICAL FIELD

This invention relates to an ergonomically designed computer input device. More specifically, the invention relates to an ergonomically designed computer input device for supporting the hand of a user and having a user-manipulable movable ball.

BACKGROUND OF THE INVENTION

Computer input devices for entering commands into a computer are well known and currently available in a variety of configurations. Many such input devices take the form of a mouse or a trackball device. The term "mouse" is commonly used to refer to a computer input mouse design having a tracking system such as a lower mounted ball or an optical tracking system, for determining the relative movement between the mouse and a surface upon which it rests. The term "trackball device" is commonly used to refer to a computer input device having a body and a rotatable ball coupled to the body for direct manual engagement by a user when the trackball device is resting on a supporting surface. Both the mouse and the trackball device can control the cursor on a computer screen.

A mouse frequently includes a rotatable ball mounted to the bottom of a housing. When the mouse is moved over a supporting surface, encoders sense the movement of the ball and generate signals indicative of the direction and amount of that movement. The signals are supplied to a computer and used, for example, to control movement of a cursor on the screen of the computer. The cursor on the computer screen would then be moved in a direction and by an amount corresponding to the movement of the ball. In another arrangement for the mouse, an optical tracking system is used in lieu of the mechanical ball tracking system to measure movement of the mouse with respect to the supporting surface.

A trackball-type input device, on the other hand, has its rotatable ball exposed for manipulation by the user's finger(s) and/or thumb. Ball-movement signals are generated, similar to those described with a mouse, and a cursor on the computer screen is moved in a direction and by an amount corresponding to the movement of the ball. The rotatable ball may be sensed by any conventional mechanical or optical sensing system or any other desired technique. For example, if a mechanical sensing system is used, the ball may be supported on a pair of perpendicular rollers. If an optical sensing system is used, a light source may be reflected off of a portion of the ball, and an optical sensor may determine the relative movement of the ball.

Computer input devices, including the mouse and the trackball device, may also include one or more buttons and/or a wheel. Typically, depressing one of the buttons changes the state of an associated switch, which permits a user to enter various commands into the computer. The nature of the command usually depends upon the position of the cursor on the screen. A roller or wheel typically protrudes from the top of the device and is coupled to an encoder for producing a signal indicating the rotation of the wheel. That signal may be used, for example, for scrolling through a window displayed on the computer, which function was heretofore performed by moving the cursor to the window "scroll bar" and depressing a button as needed to scroll through whatever is displayed in the window. For convenience, the wheel will hereafter be referred to as a "scrolling wheel." The buttons, trackball, and scrolling wheel may be collectively referred to as the actuators carried on the input device.

Irrespective of the type of input device employed, mouse or trackball, it is advantageous that the device be comfortable for the user to operate, especially over long periods of time. Such comfort is obtained by careful attention to ergonomic factors, particularly toward minimizing stress in the user's fingers, wrist, and forearm. Providing a comfortable computer input device can be especially challenging when one's design goal includes enhancing the function of the device over prior devices. Particularly, prior art thumb-controlled trackball devices include drawbacks relating to comfort and/or functionality preventing optimal usability. For example, existing trackball devices do not adequately support the user's thumb without restricting its motion.

Accordingly, an improved ergonomic computer input device was thus needed that overcomes drawbacks of existing designs. More specifically, an improved ergonomic thumb-controlled trackball device that maximizes comfort and functionality was thus needed.

SUMMARY OF THE INVENTION

In view of the foregoing, the present invention provides an improved computer input device that eliminates the drawbacks of the prior art.

The present invention also provides a computer input device that effectively supports the hand enabling comfortable and efficient activation of various actuators positioned on the housing by the user.

According to one aspect, the invention is directed to a computer input device that comfortably supports the hand of the user while the thumb and fingers are associated with buttons, a trackball, and a scrolling wheel carried on the device.

The present invention provides a computer input device having a housing with a finger side surface adapted for interfacing with a plurality of fingers of the hand of the user and a thumb side surface. The thumb side surface faces in a direction generally away from the finger side surface. The housing also has a base surface adapted to interface with a horizontal work surface. The housing also has an actuator having a sphere for manipulation by the thumb of the user. The sphere is mounted to the housing for rotational movement, and the sphere has an exposed portion extending from the thumb side surface. The thumb side surface in regions adjacent the exposed portion of the sphere is angularly disposed from the horizontal work surface in a lateral direction by an angle between 40 and 60 degrees. This enables the motion of the thumb to fall along the natural axis of flexion/extension when controlling the sphere to move the cursor. In another aspect, the finger side surface includes a elongated region adapted for supporting the metacarpal-phalangeal region of the hand of the user. The thumb side surface in regions adjacent the exposed portion of the sphere is angularly disposed from the elongated region of the finger side surface in a lateral direction by an angle between 75 and 100 degrees.

In yet another aspect of the present invention, a computer input device includes a housing having an upper surface, and first, second, third, fourth, and fifth actuators disposed on said upper surface. This allows the fingers to move within a natural range of motion and control the five input devices.

In another aspect of the present invention, a computer input device includes a housing and first and second input buttons on the upper surface of the housing. One input button is positioned immediately adjacent to the other input button in both lateral and longitudinal directions. This positioning allows the user to move his or her fingers between the two buttons with either a side-to-side or forward-and-back translation.

In a further aspect, a computer input device includes a housing and first and second actuators. The housing has a finger side surface adapted for interfacing with a plurality of fingers of the hand of the user and a thumb side surface. The thumb side surface faces in a direction generally away from the finger side surface. The finger side surface has a radial side edge and an ulnar side edge. Each of said first and second actuators including an input button. The input button of the first actuator has a portion located on the radial side edge. The input button of the second actuator has a portion located on the ulnar side edge. Both input buttons include a raised locating projection thereon.

Additionally, one aspect of the present invention includes a computer input device having a housing and first and second actuators. The housing includes a finger side surface, a thumb side surface, and a palm surface. The finger side surface can interface with fingers of the hand of the user. The thumb side surface generally faces away from the finger side surface. The palm supporting surface can support the base of the thumb and the palm of the hand of the user. The housing further includes a base surface adapted to interface with a horizontal work surface, and a proximal end adapted to be adjacent the wrist of the user. The first including a partly-exposed sphere mounted to said housing for rotational movement and for manipulated by the thumb of the user. The second actuator is mounted to the finger side of said housing and can be manipulated by a finger of the user. The palm supporting surface is convex from adjacent said sphere to the proximal end of the housing. This supports the heel of the user's palm below the thumb to provide constant thumb support.

In a further aspect, the invention discloses a method for providing input signals to a computer including the step of supporting the hand entirely on the computer input device, and resting the base of the thumb on a supporting surface on the computer input device. The thumb is placed against a sphere rotatably mounted to the computer input device. Additionally, the thumb is moved to rotate the sphere.

The foregoing and other features and advantages of the preferred embodiments of the present invention will be more readily apparent from the following detailed description, which proceeds with reference to the accompanying drawings.

DETAILED DESCRIPTION OF PREFERRED EMBODIMENTS

FIGS. 1–7 and 9–11 depict an ergonomic computer input device 20 configured in accordance with a preferred embodiment of the present invention. The device 20 includes a body or housing 22 having a base or flattened bottom 23 for resting on a planar work surface, such as a desktop 25. The housing 22 is preferably comprised of a plurality of pieces to facilitate the assembly process. The housing 22 is preferably made from a rigid plastic or other suitable material. The input device 20 has a plurality of actuators carried by the housing 22 enabling a user to provide desired signals to a computer.

In a preferred embodiment as shown in the figures, six independently-operable actuators are carried by the housing 22. The actuators preferably include a plurality of buttons or buttons 28, 30, 37 and 39, a trackball 32, and a wheel 34. It is recognized that through various known arrangements, such as a software driver, each of the buttons 28, 30, 37 and 39 can be mapped and/or remapped to provide a signal resulting in any desired command acceptable for various software applications. Additionally or alternatively, if desired, a processor or other intelligent device may be included inside of the housing 22. However, for reference purposes, the buttons 28, 30, 37 and 39 are referred to in the specification by a preferred input that they may provide. For example, button 28 provides a signal that is "primary" for most software programs and is herein referred to as the primary button 28. Button 30 provides a signal that is "secondary" for most software programs and is herein referred to as the secondary button 30. Buttons 37 and 39 preferably provide signals that respectively correspond to "back" and "forward" commands on an internet browser program. These buttons 37 and 39 are herein referred to as the back button 37 and the forward button 39.

Each of the buttons 28, 30, 37, and 39 may be depressed. A switching function is carried out by depressing each button, like the function performed by a conventional mouse when one depresses or "clicks" a button. Specifically, depressing any of the buttons 28, 30, 37, and 39 changes the associated switch state and generates a signal that is conveyed via conductors in a cord 36 to a computer 40. One end of the cord 36 is anchored inside of the device housing 22. The cord emanates from the front or distal end 38 of the device 20, and the other end of the cord is coupled with the computer 40. However, it is recognized that a cord 36 is not needed and the device 20 may be wirelessly coupled to computer 40 by any known arrangement, such as by transmitting and receiving infrared, radio frequency, or ultrasonic signals.

Figure 1:
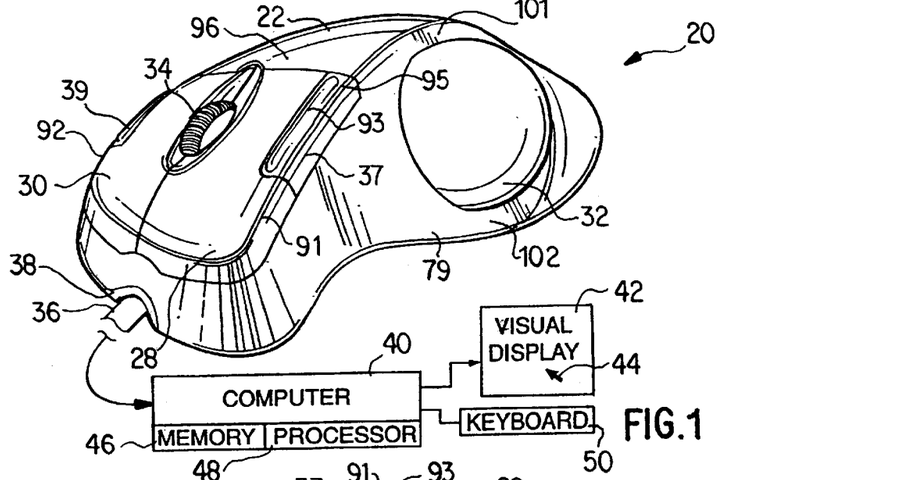
FIG. 1 is a front-radial perspective view of the computer input device schematically coupled to a computer.

The computer 40 may be any one of many different designs. As one example of the many possible configurations and arrangements of devices that the input device 20 may transmit signals to, the computer 40 preferably includes a visual display device 42. The display 42, which may be a cathode ray tube-type, active matrix display, or other suitable device, can display a cursor or pointer 44, along with text and other graphic information. The computer may also include storage or memory 46, a processor 48, and a keyboard 50.

The tracking ball 32 is a sphere and preferably mounted in a concave region of the housing 22 for rotation about any axis. The tracking ball 32 includes an exposed surface when it is resting on a supporting surface 25 permitting it to be directly manipulated by a user. To operate the tracking ball 32, the housing 22 remains stationary and the ball 32 is moved relative to the housing 22 by the user. Optical and/or mechanical sensors detect the movement of the ball 32 in a conventional manner. The sensed movement of the ball 32 is processed and a signal correlating to the rotation of the ball 32 is conveyed via cord 36 or wirelessly to the computer 40. The received signals may be employed, for example, for moving the pointer or cursor 44 across the display 42.

The wheel 34 may be of any desired type. For example, the wheel 34 may be supported on an axle that resides within the body 22 of the input device. That axle may be carried by spaced-apart axle supports. Optical and/or mechanical sensors detect the movement of the wheel 34 in a conventional manner. For example, an optical encoder may be positioned on the axle for rotation with the wheel. A light source and a light sensor may be mounted within the device to sense the motion of the optical encoder. The sensed movement of the wheel 34 is processed and a signal correlating to the rotation of the wheel 34 is conveyed via cord 36 or wirelessly to the computer 40. The received signals may be employed, for example, for scrolling an image on the display 42.

If desired, the axle supports can be configured to allow one or both ends of the axle to move in a direction that is generally perpendicular to the axis of rotation of the wheel. Thus, the wheel may be depressed, slightly moving its axle to activate a switch. A spring is contained within the housing and arranged to resist depression of the wheel and bias the wheel 34 into an outward position. The switch that is engaged as a result of depression of the wheel provides a switching signal. A detent mechanism may also be provided on the axle to provide a segmented feel to the rotation of the wheel 34. The wheel switch signal is conveyed via the cord 36 or wirelessly to the computer for any desired purpose.

Figure 8:
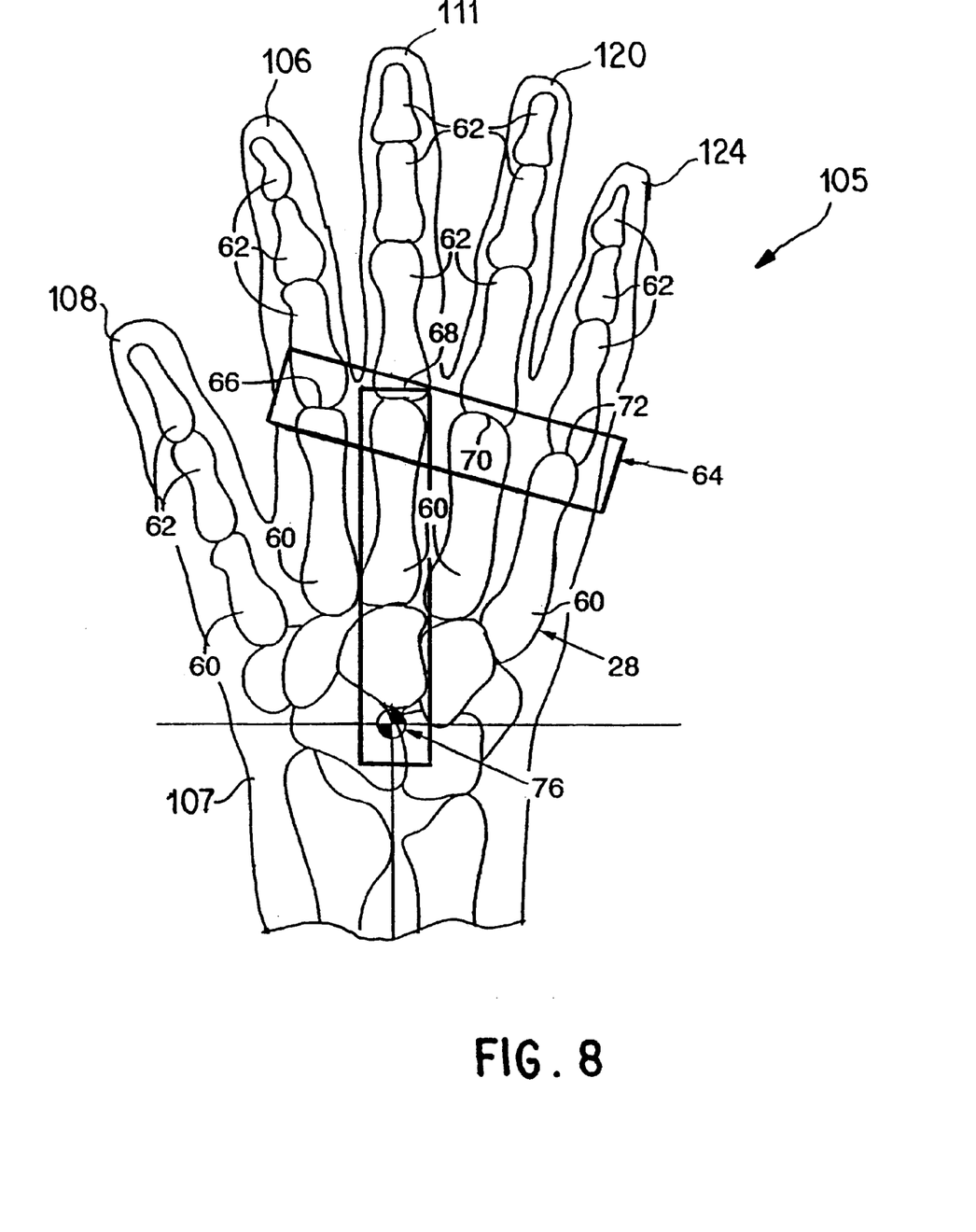
FIG. 8 is a top plan view skeletal diagram of the right hand of a user with the outer edges of the finger and hand superimposed thereon.

Before proceeding with additional characteristics of the input device 20, certain concepts and terminology relating to the human hand are herein described. This is accomplished in part by reference to FIG. 8. As shown in FIG. 8, the hand 105 has a wrist area 107 with a wrist joint 76. There are five major hand bones radiating from the wrist area 107, which are known as the metacarpals 60. The finger bones number fourteen in each hand and are designated phalanges 62. While the depicted embodiment represents a right-hand input device, a mirror image version may be provided for use by a user's left hand. Accordingly, a right hand is depicted in FIG. 8 and also in FIG. 9–13. In this description, the particular fingers will carry conventional designations: from left to right in FIG. 8, the thumb 108, the index finger 106, the middle finger 111, the ring finger 120, and the little finger 124.

Where the index, middle, ring, and little finger 106, 111, 120, and 124 meet the palm 109, or more precisely, where the metacarpal bones 60 and phalangeal bones 62 of the fingers join, there are metacarpal-phalangeal joints 66, 68, 70, 72. A metacarpal-phalangeal ridge 64 is defined by the portion of the hand in the vicinity of these four joints. Thus, the metacarpal-phalangeal ridge 64 includes the metacarpal-phalangeal joints of all of the fingers except for the thumb. The housing 22 of input device 20 is configured to support the metacarpal-phalangeal joint ridge 64 and the remainder of the hand 105, so that the user's hand and arm remain comfortable, and the user's fingers may comfortably manipulate the actuators. Further, the terms lateral and longitudinal are directional terms used herein. The term lateral as used herein is defined as a direction generally through the hand, that is, across the metacarpal bones 60. The term longitudinal as used herein is defined as a direction along the length of the hand, that is in the direction of the metacarpal bones 60.

Figure 9:
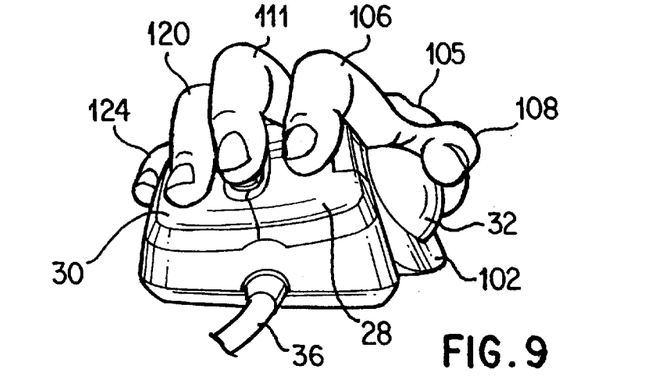
FIG. 9 is a view similar to FIG. 4 showing the relationship between the hand of the user and the computer input device.
Figure 10:
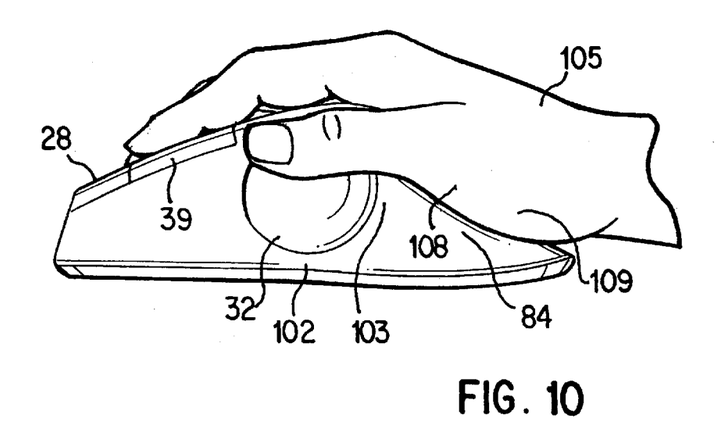
FIG. 10 is a view similar to FIG. 6 showing the relationship between the hand of the user and the computer input device.
Figure 11:
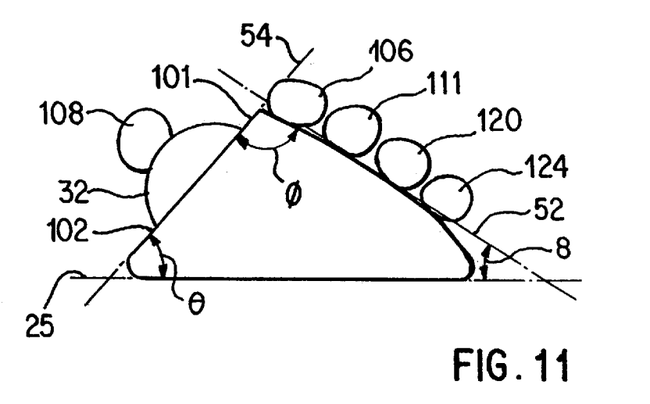
FIG. 11 is a cross sectional view taken through line 11—11 of FIG. 3 illustrating the relationship between thumb of the user and computer input device.

As seen in FIGS. 1–7, the housing 22 includes an upper hand supporting surface 81 that is preferably sized to support the entire hand 105 when the input device 20 is in use. However, in use, the thumb 108 of the user may be supported on the trackball 32 as shown in FIGS. 9–11. For clarity purposes, it is noted that certain portions of the input device 20 and views are described in conjunction with corresponding portions of the human hand 105. For example, the side of the input device 20 where the thumb 108 lies when in use is referred to herein as the radial or thumb side 71. Similarly, the side of the input device 20 where the remaining four fingers 106, 111, 120, 124 lie when in use is referred to herein as the ulnar or finger side 73.

The upper hand supporting surface 81 includes a palm supporting surface 86 at its rear or proximal end 82 that is adapted to support the palm 109 of the user, and an ulnar or finger supporting surface 96 on the finger side 73 that is adapted to support the remaining four fingers 106, 111, 120, 124 of the user when the input device 20 is in use. The palm supporting surface 86 also has a radial or thumb supporting region 84 that is adapted to support the base of the thumb of the user when the input device 20 is in use. The ulnar or finger supporting surface 96 also supports the metacarpal-phalangeal joint ridge 64. An ulnar side wall 97 vertically spaces the ulnar side of the finger supporting surface 96 from the desktop or work surface 25. The radial side 71 also includes an outer surface 79.

In a preferred arrangement, the thumb side 71 includes the trackball 32. The finger side 73 includes the scroll wheel 34 and the primary, secondary, back, forward buttons 28, 30, 37 and 39. This configuration assists in an efficient and comfortable interface that provides a wide number of command options. The finger side 73 and the thumb side 71 are preferably divided by a dividing ridge 95. As is evident from FIGS. 2 and 3, the dividing ridge 95 is asymmetrical. This enables the thumb 108 of the user to effectively manipulate the trackball 32 and the remaining four fingers 106, 111, 120, and 124 to effectively control the other five actuators.

As best shown in FIGS. 3–6, the radial or thumb side 71 includes an outer surface 79 that generally faces away from the finger side surface 73. That is, the outer surface 79 of the thumb side 71 faces more towards the radial direction than the ulnar direction. A ball 32 from a trackball-type actuator is rotatably mounted in the thumb side 71 of the housing 22 and has an exposed portion that extends from the thumb-side outer surface 79. This exposed portion of the trackball 32 is to be manipulated by the thumb 108 of the user.

Figure 2:
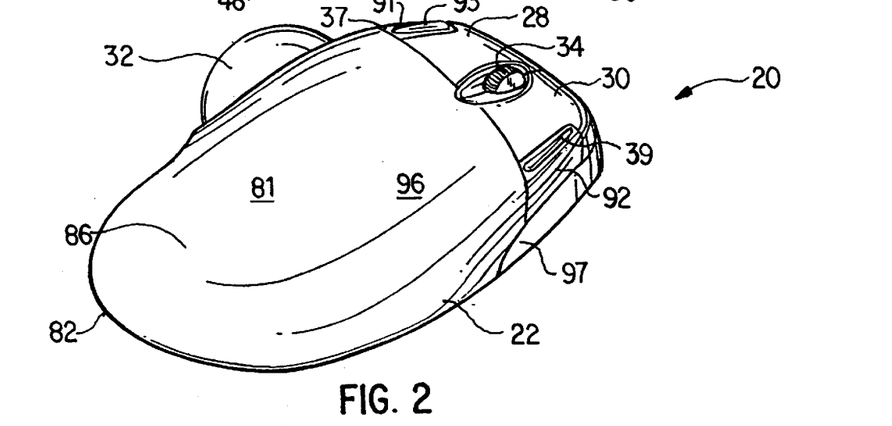
FIG. 2 is a rear-ulnar perspective view of the computer input device of FIG. 1.
Figure 3:
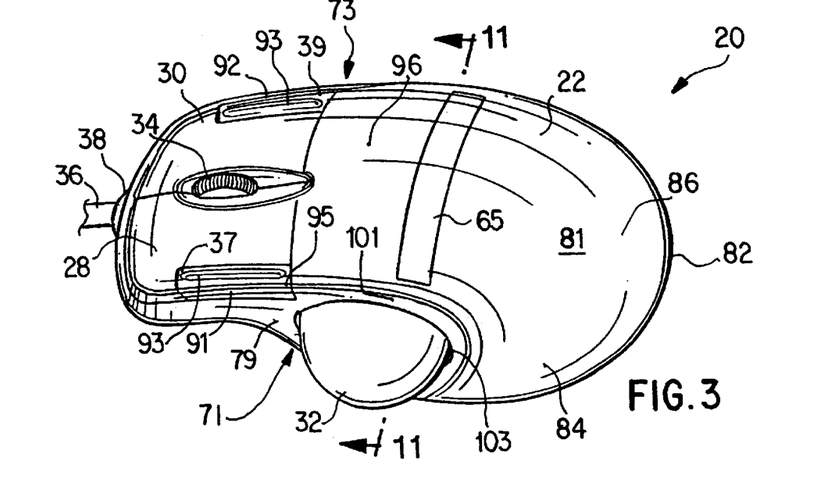
FIG. 3 is a top plan view of the computer input device of FIG. 1.
Figure 4:
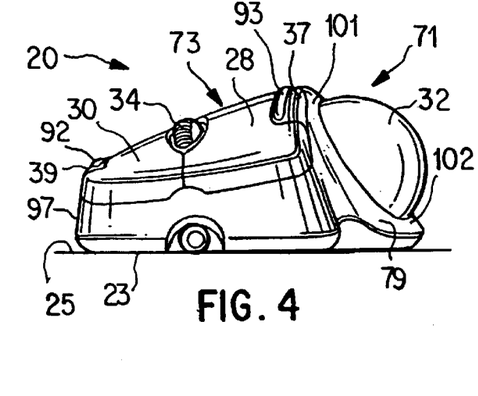
FIG. 4 is a front elevational view of the computer input device of FIG. 1.
Figure 5:
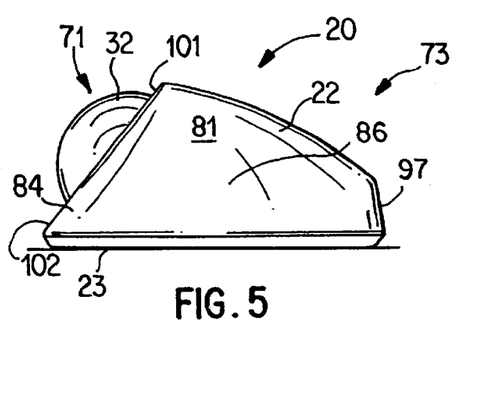
FIG. 5 is a rear elevational view of the computer input device of FIG. 1.
Figure 6:
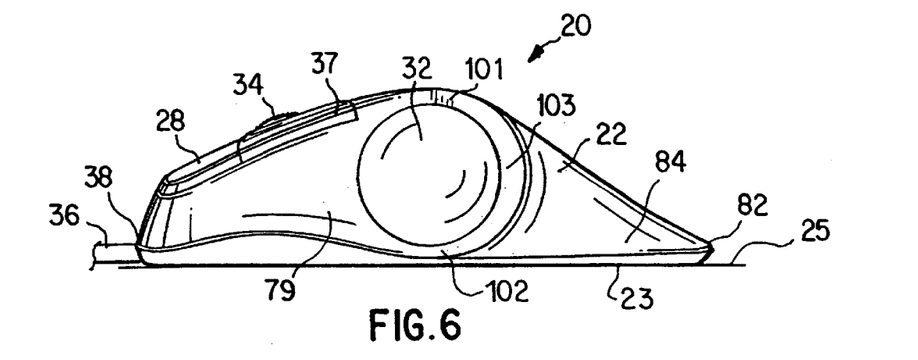
FIG. 6 is a radial side elevational view of the computer input device of FIG. 1.
Figure 7:
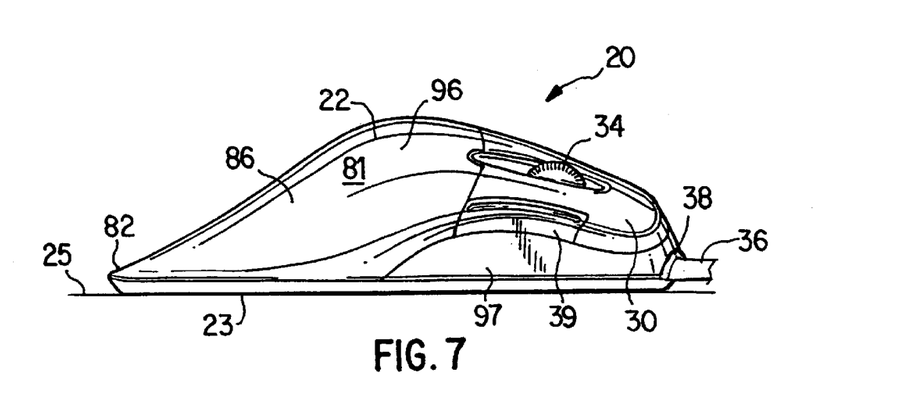
FIG. 7 is an ulnar side elevational view of the computer input device of FIG. 1.

As shown in FIGS. 1–3, the finger or ulnar side 73 includes the scroll wheel 34, the primary and secondary buttons 28 and 30, and the back and forward buttons 37 and 39. These actuators extend from the radial side edge 91 of the finger side surface 96 to the ulnar side edge 92 of the finger side surface 96. As can be seen, each input button 28, 30, 37, and 39 is preferably substantially rectangular. Toward the center of the surface 96, the primary button 28 is positioned immediately laterally adjacent to the secondary button 30. The back button 37 is effectively embedded within the larger primary button 28. Similarly, forward button 39 is effectively embedded within the larger secondary button 30. Thus, as arranged, the primary button 28 is located immediately adjacent to the back button 37 in both lateral and longitudinal directions. Similarly, the secondary button 30 is located immediately adjacent to the forward button 39 in both lateral and longitudinal directions. This relative positioning between the primary and back buttons 28 and 37 allows the user to move his or her finger between the two input buttons 28 and 37 with either a side-to-side or forward-and-back translation. Similar advantages and features exist on the other end of the finger-side surface with the secondary and forward buttons 30 and 39. Proper positioning of the digits with respect to the thumb 108 is accomplished by the positioning of the exposed portion of the wheel 34 and the four input buttons 28, 30, 37, and 39 entirely in front of the exposed portion of the sphere 32. Further, as seen in the figures, the radial sides of the primary and back input buttons 28 and 37 form part of the dividing ridge 95.

This arrangement of buttons enables the user to easily shift his or her fingers laterally between the primary and back buttons 28 and 37 or the secondary and forward buttons 30 and 39 in a natural direction of movement along the axis of abduction/adduction. This will, in turn, reduce possible fatigue and increase control. The input buttons 28, 30, 37 and 39 are actuated by a generally downward applied force by the desired finger by a flexion movement. This prevents the user from having to rotate or twist their fingers awkwardly to depress the buttons 28, 30, 37 and 39.

A scroll wheel 34 of an actuator is mounted for rotation on the finger side surface 96 of the housing 22. The scroll wheel 34 includes an exposed portion that is manipulated by a desired finger of the user during use. The wheel 34 is laterally positioned immediately adjacent to, and between, the primary and secondary buttons 28 and 30, and between the back and forward buttons 37 and 39.

As is evident from FIG. 3, all five of the actuators 28, 30, 34, 37, 39 on the finger side 73 of the input device 20 are aligned in a single, generally-lateral row extending across the finger-side surface 96 through the wheel 34. Behind the wheel 34, all four of the button-type actuators 28, 30, 37, 39 on the finger side 73 of the input device 20 are aligned in a single, generally-lateral row extending across the finger-side surface 96. In front of the wheel 34, the primary and secondary buttons 28 and 30 are aligned in a single, generally-lateral row extending across the finger-side surface 96. In each of these cases, the row of actuators extends the entire distance from the radial side edge 91 of the finger side surface 96 to the ulnar side edge 92 of the finger side surface 96. This arrangement allows the four non-thumb fingers 106, 111, 120, 124 to move within a natural range of motion, an effective control of the finger-side actuators, and user flexibility to place his or her fingers on the specific actuators that provide the most comfort and efficiency.

As seen in FIGS. 1–3 and 7, the back and forward input buttons 37 and 39 each preferably include at least one raised vertical projection 93 thereon. These projections 93 are positioned on the finger side surface 96 adjacent the radial and ulnar side edges 91 and 92 of the finger side surface 96. The projections 93 may take any desired number or shape. Each projection 93 provides effective tactile feedback for positioning purposes when moving a finger onto it, without having to look away from the computer display 42.

The general arrangement of the ball 32, the outer surface 79 of the thumb side 71, and the upper surface 96 on the finger side 73 adjacent the ball 32 that supports the metacarpal-phalangeal ridge 64 helps to provide thumb stops 101, 102, and 103 in three directions and facilitate control of the actuators. As seen in FIG. 11, this surface of the region around the ball 32 generally defines a plane 54 that is laterally disposed by an angle θ with respect to the horizontal work surface 25. This angle θ is preferably between 40 and 60 degrees, and more preferably, between 50 and 55 degrees.

As seen in FIG. 3, the upper surface 96 on the finger side 73 adjacent the ball 32 has a generally laterally extending region 65 that supports the metacarpal-phalangeal ridge 64 of the hand when in use. As seen in FIG. 11, although slightly curved, this surface of this region 65 generally defines a metacarpal-phalangeal support plane 52. The plane 52 is displaced from the thumb surface plane 54 by angle φ. This angle φ is preferably between 75 and 100 degrees, and more preferably, between 80 and 90 degrees. The interior angle β between the metacarpal-phalangeal support plane 52 and the horizontal work surface 25 is preferably between 20 and 65 degrees, and more preferably, between 35 and 50 degrees.

These angular relationships φ, β, and θ help towards the effectiveness of the surfaces immediately surrounding the ball 32 functioning as thumb stops 101, 102, and 103. Thus, the surface immediately above the ball 32 serves as a thumb stop 101 when the thumb 108 of the user is moved inwardly or in an ulnar direction tending to move off the ball 32. This may occur when the user is moving a cursor 44 to the right relative to the display 42. The surface immediately below the ball 32 serves as a thumb stop 102 when the thumb 108 of the user is moved outwardly or in a radial direction tending to move off the ball 32. This may occur when the user is moving a cursor 44 to the left relative to the display 42. Lastly, the surface immediately behind the ball 32 serves as a thumb stop 103 when the thumb 108 of the user is moved rearwardly tending to move off the ball 32. This may occur when the user is moving a cursor 44 downward relative to the display 42.

When the hand 105 is naturally positioned on the computer input device 20 the wrist is straight with minimal extension, deviation, and pronation. The point of operation at the distal phalange of the thumb 108 is generally perpendicular to the surface of the input buttons 28, 30, 37, and 39. The exposed portion of the trackball 32 matches the vertical presentation of the thumb 108 when the hand 105 is optimally positioned. This aids to correlate the natural flexion/extension motions and the natural abduction/adduction motions of the thumb 108 to the vertical and horizontal motions of the graphical user interface's cursor 44.

Further, the placement and size of the ball 32 may assist in these functions. For example, the placement of the ball 32 allows thumb 108 to rest upon it without undue abduction, bending backwards and without undue adduction, bending inwards. The trackball 32 preferably has a diameter in the range of 34 mm to 42 mm to help support the thumb 108, permit it to move in more natural directions, and to aid in the effectiveness of the thumb stops 101–103.

The palm supporting surface 86 is convex from adjacent the ball 32 to the proximal end 82 of the housing 22. This helps to produce the radial or thumb supporting region 84 that is adapted to support the palm 109. Specifically, this region 84 fully supports the hand 105 beneath the metacarpal bone 60 of the thumb 108 when the thumb 108 is passing between ball motions without restricting thumb motion. This is beneficial in combination with the support of the entire hand 105 on the input device 20. While one convex arrangement for this region 84 and the palm supporting surface 86 is shown in the figures, it is recognized that numerous other convex configurations may be used.

A preferred embodiment is depicted to scale in the drawing figures. It is preferably sized to completely support the entire hand 105 of the user off of the support or work surface 25. Accordingly, in use, the user's heel of the hand, the ulnar side of the hand including the little finger, and the radial side of the hand including the thumb are preferably supported by the device 20 so that they do not touch the surface 25. In one of an infinite number of arrangements, the length is approximately 6.75 inches and its width is approximately 4 inches. In this preferred arrangement, the scroll wheel 34 preferably has a diameter of approximately 1 inch, and the ball 32 preferably has a diameter of approximately 38 mm. In this same embodiment, the back and forward buttons 37 and 39 are preferably 38 mm by 8 mm. However, the invention is not limited to such dimensions and it is recognized that numerous other sizes may be used. Importantly, it is recognized that the housing can be in any of a number of infinite shapes with varying proportions and shapes of actuators.

In operation, the user places his or her hand 105 on the computer input device 20. As the computer input device 20 is sized to accommodate the entire hand 105, the user may comfortably rest the entire weight of his or her hand 105 including the base of the thumb on the input device 20 without any part of the hand 105 touching the work surface 25 upon which the input device 20 sits. This total support of the hand 105 may continually exist for all activations of the actuators. In this process, the user places his or her thumb 108 on the thumb side 71, and more specifically, places it on the rotatably mounted ball 32 as shown in FIGS. 9–11. The user places his or her remaining fingers 106, 111, 120 and 124 on the finger side 73 so that the upper surface 96 of the finger side 73 comfortably supports the metacarpal-phalangeal ridge 64 and the fingers.

The ball 32 is activated by the user's thumb 108 by merely moving the thumb 108 in a desired direction. Typically, upward, downward, and forward and backward movements along the natural axes of the thumb 108 produce left, right, up, and down movements, respectively, of the cursor 44 with respect to the display 42. Thumb stops 101–103 effectively prevent the thumb 108 from disengaging from the ball 32 for upward, downward, and backward movements of the thumb 108.

The actuators on the finger or ulnar side 73, that is the primary button 28, the secondary button 30, the back button 37, the forward button 39, and the scroll wheel 34, are activated by the user's remaining four fingers 106, 111, 120, and 124. These fingers 106, 111, 120, and 124 may be placed in any of a number of optional configurations with respect to the finger support surface 96. In one arrangement, as shown in FIGS. 9–11, the index finger 106 may be used to control the primary and back input buttons 28 and 37, the middle finger 111 may be used to control the scroll wheel 34, and the ring finger 120 may be used to control the secondary and forward input buttons 30 and 39. However, it is recognized that users may position their fingers to control the various finger-side actuators based on comfort, efficiency, and other personal preferences. The input buttons 28, 30, 37, and 39 may be activated by pressing generally downward in a natural flexion motion with a desired finger properly positioned over the button to be activated. Control by a single finger of the primary and back buttons 28 or 37 or the secondary and forward buttons 30 and 39 may be easily accomplished as the user may use his or her desired finger laterally or longitudinally between the two buttons in each pair. The wheel 34 may be rotated in a forward or backward direction in a natural motion. This arrangement effectively reduces fatigue, and facilitates activation.

Activating the desired activators will provide a corresponding input signal to the computer 44. The signals are processed into a corresponding command as determined by a computer program. That command may be used for other programs. The activators may be remapped in a known manner so that certain activators behave to send signals that produce commands normally expected by other activators. For example, the input buttons 28, 30, 37 and 39 may be mapped so that the described back and forward buttons 37 and 39 provide signals that result in commands normally expected from primary and secondary input buttons 28 and 30, and vice-versa. This is beneficial for users having finger usage preferences for certain applications.

Having illustrated and described the principles of the present invention in a preferred embodiment, it should be apparent to those skilled in the art that the embodiment can be modified in arrangement and detail without departing from such principles. For example, the invention contemplates using the aligned finger side actuators on a non-trackball input device such as computer mouse. Accordingly, we claim as our invention all such embodiments as come within the scope and spirit of the following claims and equivalents thereto.

What is claimed is:

1. A computer input device adapted for use by a hand of a user comprising:

a housing having a finger side surface adapted for interfacing with a plurality of fingers of the hand of the user and a thumb side surface, said thumb side surface generally facing away from the finger side surface, said housing further having a base surface adapted to interface with a horizontal work surface; and a first actuator, said first actuator including a sphere, said sphere mounted to said housing for rotational movement, said sphere having an exposed portion extending from the thumb side surface and adapted to be manipulated by the thumb of the user, wherein said thumb side surface in regions adjacent the exposed portion of the sphere is angularly disposed from the horizontal work surface in a lateral direction by an angle between 50 and 55 degrees.

2. The computer input device of claim 1, wherein said finger side surface includes an elongated region adapted for supporting the metacarpal-phalangeal region of a hand of the user, wherein said thumb side surface in regions adjacent the exposed portion of the sphere is angularly disposed from the elongated region of the finger side surface in a lateral direction by an angle between 75 and 100 degrees.

3. The computer input device of claim 2, wherein said thumb side surface in regions adjacent the exposed portion of the sphere is angularly disposed from the elongated region of the finger side surface in a lateral direction by an angle between 80 and 90 degrees.

4. The computer input device of claim 1, wherein said sphere includes a diameter in the range of 34 mm to 42 mm, and said thumb side surface includes a thumb stopping extension located immediately above said sphere, said thumb stopping extension adapted to provide a stop when the thumb of the user is moved inwardly off of the sphere.

5. The computer input device of claim 1, further comprising a second actuator, said second actuator including a wheel mounted for rotation on the finger side surface of the housing, said wheel having an exposed portion adapted to be manipulated by a finger of the user, wherein the exposed portion of the wheel is located entirely in front of the exposed portion of the sphere.

6. The computer input device of claim 5, wherein said housing further having a palm supporting surface adapted to support the base of the thumb and the palm of the hand of the user, and a proximal end adapted to be adjacent the wrist of the user, wherein said palm supporting surface is convex from adjacent said sphere to said proximal end of the housing.

7. A computer input device adapted for use by a hand of a user comprising:
   a housing having a finger side surface adapted for interfacing with a plurality of fingers of the hand of the user and a thumb side surface, said thumb side surface generally facing away from the finger side surface, said housing further having a base surface adapted to interface with a horizontal work surface; and
   a first actuator, said first actuator including a sphere, said sphere mounted to said housing for rotational movement, said sphere having an exposed portion extending from the thumb side surface and adapted to be manipulated by the thumb of the user,
   wherein said thumb side surface in regions adjacent the exposed portion of the sphere is angularly disposed from the horizontal work surface in a lateral direction by an angle between 40 and 60 degrees; and
   a second actuator and a third actuator, each of said second and third actuators including an input button positioned on the finger side surface.

8. The computer input device of claim 7, wherein the finger side surface includes a radial side edge and an ulnar side edge, said buttons of the second and third actuators span the entire distance from the radial side edge of the finger side surface of the housing to the ulnar side edge of the finger side surface of the housing.

9. The computer input device of claim 7, further comprising a fourth actuator and a fifth actuator, each of said fourth and fifth actuators including an input button positioned on the finger side surface.

10. The computer input device of claim 9, wherein the finger side surface includes a radial side edge and an ulnar side edge, said buttons of the second, third, fourth, and fifth actuators span the entire distance from the radial side edge of the finger side surface of the housing to the ulnar side edge of the finger side surface of the housing.

11. The computer input device of claim 9, further comprising a sixth actuator, said sixth actuator including a wheel mounted for rotation on the finger side surface of the housing, said wheel having an exposed portion adapted to be manipulated by a finger of the user, said exposed portion of said wheel being located immediately adjacent to and between said buttons of the second and third actuators.

12. The computer input device of claim 11, wherein the finger side surface includes a radial side edge and an ulnar side edge, said buttons of the second, third, fourth, and fifth actuators and the exposed portion of the wheel span the entire distance from the radial side edge of the finger side surface of the housing to the ulnar side edge of the finger side surface of the housing.

13. The computer input device of claim 11, wherein the exposed portion of the sphere is located entirely behind of the exposed portion of the wheel and the buttons of the second, third, fourth, and fifth actuators.

14. The computer input device of claim 9, wherein said button of said fourth actuator is located immediately adjacent to the button of said second actuator in both lateral and longitudinal directions.

15. The computer input device of claim 14, wherein said button of said fifth actuator is located immediately adjacent to the button of said third actuator in both lateral and longitudinal directions.

16. The computer input device of claim 9, wherein said buttons of said fourth and fifth actuators include a raised projection thereon.

17. A computer input device adapted for use by a hand of a user comprising:
   a housing having a finger side surface adapted for interfacing with a plurality of fingers of the hand of the user and a thumb side surface, said thumb side surface generally facing away from the finger side surface, said housing further having a base surface adapted to interface with a horizontal work surface; and
   an actuator including a sphere, said sphere mounted to said housing for rotational movement, said sphere having an exposed portion extending from the thumb side surface adapted to be manipulated by the thumb of the user,
   wherein said finger side surface includes an elongated region adapted for supporting the metacarpal-phalangeal region of a hand of the user, wherein said thumb side surface in regions adjacent the exposed portion of the sphere is angularly disposed from the elongated region of the finger side surface in a lateral direction by an angle between 75 and 100 degrees, and wherein said thumb side surface in regions adjacent the exposed portion of the sphere is angularly disposed from the horizontal work surface in a lateral direction by an angle between 40 and 60 degrees; and
   wherein said thumb side surface in regions adjacent the exposed portion of the sphere is angularly disposed from the elongated region of the finger side surface in a lateral direction by an angle between 80 and 90 degrees.

18. The computer input device of claim 17, wherein said sphere includes a diameter in the range of 34 mm to 42 mm.

19. The computer input device of claim 18, further comprising a second actuator, a third actuator, and a fourth actuator, said second actuator including a wheel mounted for rotation on the finger side surface of the housing, said wheel having an exposed portion adapted to be manipulated by a finger of the user, wherein the exposed portion of the wheel is located entirely in front of the exposed portion of the sphere, and each of said third and fourth actuators including an input button positioned on the finger side surface.

20. The computer input device of claim 17, wherein said thumb side surface includes a thumb stopping extension located immediately above said sphere, said thumb stopping extension adapted to provide a stop when the thumb of the user is moved inwardly off of the sphere.

21. The computer input device of claim 20, wherein said housing further having a palm supporting surface adapted to support the base of the thumb and the palm of the hand of the user, and a proximal end adapted to be adjacent the wrist of the user, wherein said palm supporting surface is convex from adjacent said sphere to said proximal end of the housing.

22. A computer input device adapted for use by a hand of a user comprising:
- a housing, said housing including a finger side upper surface adapted for interfacing with a plurality of fingers of the hand of the user, and a thumb side surface;
- a rotationally movable ball disposed for manipulation by the user; and
- first, second, third, fourth, and fifth actuators disposed on said finger side upper surface and aligned in a single, generally-lateral row;
- wherein said first actuator includes a wheel mounted for rotation, said wheel having an exposed portion adapted to be manipulated by a finger of the user.

23. The computer input device of claim 22, wherein said second and third actuators each include an input button, said wheel being disposed between said input buttons of said second and third actuators.

24. A computer input device adapted for use by a hand of a user comprising:
- a housing, said housing including an upper surface;
- a rotationally movable ball disposed for manipulation by the user; and
- first, second, third, fourth, and fifth actuators disposed on said upper surface;
wherein said first actuator includes a wheel mounted for rotation, said wheel having an exposed portion adapted to be manipulated by a finger of the user; wherein said second and third actuators each include an input button, said wheel being disposed between said input buttons of said second and third actuators; and wherein the upper surface includes a radial side edge and an ulnar side edge, said buttons of the second and third actuators span the entire distance from the radial side edge of the upper surface of the housing to the ulnar side edge of the finger side surface of the housing.

25. The computer input device of claim 23, wherein said fourth and fifth actuators each include an input button.

26. The computer input device of claim 25, wherein the upper surface includes a radial side edge and an ulnar side edge, said buttons of the second, third, fourth, and fifth actuators span the entire distance from the radial side edge of the upper surface of the housing to the ulnar side edge of the finger side surface of the housing.

27. A computer input device adapted for use by a hand of a user comprising:
- a housing, said housing including an upper surface;
- first, second, third, fourth, and fifth actuators disposed on said upper surface; wherein said first actuator includes a wheel mounted for rotation, said wheel having an exposed portion adapted to be manipulated by a finger of the user; wherein said second and third actuators each include an input button, said wheel being disposed between said input buttons of said second and third actuators; and wherein said fourth and fifth actuators each include an input button; and
- a sixth actuator, said sixth actuator including a trackball mounted to said housing for rotational movement.

28. The computer input device of claim 27, wherein said upper surface is a finger side surface of said housing adapted for supporting four fingers of the user, said housing further includes a thumb side surface angularly disposed from said finger side surface, said trackball having an exposed portion extending from the thumb side surface adapted to be manipulated by the thumb of the user.

29. The computer input device of claim 28, wherein the finger side surface includes a radial side edge and an ulnar side edge, said buttons of the second, third, fourth, and fifth actuators and the exposed portion of the wheel span the entire distance from the radial side edge of the finger side surface of the housing to the ulnar side edge of the finger side surface of the housing.

30. A computer input device adapted for use by a hand of a user comprising:
- a housing, said housing including an upper surface;
- a rotationally movable ball disposed for manipulation by the user; and
- first, second, third, fourth, and fifth actuators disposed on said upper surface;
wherein said first actuator includes a wheel mounted for rotation, said wheel having an exposed portion adapted to be manipulated by a finger of the user; wherein said second and third actuators each include an input button, said wheel being disposed between said input buttons of said second and third actuators; wherein said fourth and fifth actuators each include an input button, and wherein said button of said fourth actuator is located immediately adjacent to the button of said second actuator in both lateral and longitudinal directions, and said button of said fifth actuator is located immediately adjacent to the button of said third actuator in both lateral and longitudinal directions.

31. The computer input device of claim 30, wherein said buttons of said fourth and fifth actuators include a raised projection thereon.

32. The computer input device of claim 23, wherein said sphere is disposed on the thumb side surface for manipulation by a thumb of the user.

33. A computer input device adapted for use by a hand of a user comprising:
- a housing, said housing including an upper surface; first, second, third, fourth, and fifth actuators disposed on said upper surface; wherein said upper surface is a finger side surface adapted for interfacing with a plurality of fingers of the hand of the user, said housing further having a thumb side surface, and a palm supporting surface, said palm supporting surface adapted to support the base of the thumb and the palm of the hand of the user, said housing further having a base surface adapted to interface with a horizontal work surface, said housing having a proximal end adapted to be adjacent the wrist of the user; and
- a sixth actuator, said sixth actuator including a sphere, said sphere mounted to said housing for rotational movement, said sphere having an exposed portion extending from the thumb side surface adapted to be manipulated by the thumb of the user,
- wherein said palm supporting surface is convex from adjacent said sphere to said proximal end of the housing.

34. The computer input device of claim 33, wherein said sphere includes a diameter in the range of 34 mm to 42 mm.

35. A computer input device adapted for use by a hand of a user comprising:
- a housing, said housing including an upper surface;
- first and second actuators disposed on said upper surface, each of said first and second actuators includes an input button, wherein said button of said second actuator is located immediately adjacent to the button of said first actuator in both lateral and longitudinal directions; and
- a sphere mounted to said housing for rotational movement;

wherein the upper surface includes a radial side edge and an ulnar side edge, said computer input device further comprising a third actuator including an input button, said buttons of the first and third actuators span the entire distance from the radial side edge of the upper surface of the housing to the ulnar side edge of the finger side surface of the housing.

36. The computer input device of claim 35, wherein said button of said second actuator is substantially rectangular.

37. The computer input device of claim 35, wherein said upper surface is a finger side surface of said housing adapted for supporting four fingers of the user, said housing further including a thumb side surface angularly disposed from said finger side surface, said sphere having an exposed portion extending from the thumb side surface and adapted to be manipulated by thumb of the user.

38. The computer input device of claim 35, further comprising a fourth actuator including an input button, wherein said button of said fourth actuator is located immediately adjacent to the button of said third actuator in both lateral and longitudinal directions.

39. The computer input device of claim 38, wherein said upper surface is a finger side surface of said housing adapted for supporting four fingers of the user, said housing further including a thumb side surface angularly disposed from said finger side surface, said sphere having an exposed portion extending from the thumb side surface and adapted to be manipulated by the thumb of the user.

40. The computer input device of claim 39, further comprising a sixth actuator, said sixth actuator including a wheel mounted for rotation, said wheel having an exposed portion adapted to be manipulated by a finger of the user, wherein said wheel is disposed between said input buttons of said-first and third actuators.

41. The computer input device of claim 40, wherein said button of said first actuator is larger than said button of said second actuator an,said button of said third actuator is larger than said button of said fourth actuator.

42. The computer input device of claim 40, wherein said buttons of said second and fourth actuators include a raised projection thereon.

43. A computer input device adapted for use by a hand of a user comprising:
   a housing, said housing including a finger side surface adapted for interfacing with a plurality of fingers of the hand of the user and a thumb side surface, said thumb side surface generally facing away from the finger side surface, said finger side surface having a radial side edge and an ulnar side edge;
   first and second actuators, each of said first and second actuators including an input button, wherein the input button of said first actuator has a portion located on the radial side edge and the input button of said second actuator has a portion located on the ulnar side edge, wherein said buttons of said first and second actuators each include a user-interfacing raised locating projection thereon; and
   a third actuator having a sphere with an exposed portion extending from the thumb side surface adapted to be manipulated by the thumb of the user.

44. The computer input device of claim 43, further comprising fourth and fifth actuators each including an input button, wherein said button of said first actuator is located immediately adjacent to the button of said fourth actuator in both lateral and longitudinal directions, and said button of said second actuator is located immediately adjacent to the button of said fifth actuator in both lateral and longitudinal directions.

45. The computer input device of claim 44, further comprising a sixth actuator, said sixth actuator including a wheel mounted for rotation, said wheel having an exposed portion adapted to be manipulated by a finger of the user, wherein said wheel is disposed between said input buttons of said third and fourth actuators.

46. The computer input device of claim 45, wherein each of the buttons of the first and second actuators is elongated being substantially greater in its longitudinal direction than in its lateral direction.

47. The computer input device of claim 44, wherein said housing further includes an asymmetrical dividing ridge separating the thumb side surface and the finger side surface.

48. The computer input device of claim 47, wherein said sphere includes a diameter in the range of 34 mm to 42 mm.

* * * * *